United States Patent [19]

Esser

[11] Patent Number: 5,517,400
[45] Date of Patent: May 14, 1996

[54] METHOD FOR SYNCHRONIZING CONVERTERS OF AN INDUCTIVE ELEMENT FOR REVERSIBLE ENERGY TRANSMISSION

[75] Inventor: Albert Esser, Schenectady, N.Y.

[73] Assignee: Ulrich Schwan, Salem-Beuren, Germany

[21] Appl. No.: 306,256

[22] Filed: Sep. 14, 1994

Related U.S. Application Data

[63] Continuation-in-part of Ser. No. 16,983, Feb. 3, 1993, abandoned.

[30] Foreign Application Priority Data

Feb. 3, 1992 [DE] Germany .................. 42 02 988.0

[51] Int. Cl.[6] ................................................. H02M 3/10
[52] U.S. Cl. ................................... 363/89; 363/127
[58] Field of Search .................. 363/84, 89, 124, 363/125, 127, 128

[56] References Cited

U.S. PATENT DOCUMENTS

3,986,097 10/1976 Woods .................................. 363/124
4,958,268 9/1990 Nagagata et al. .......................... 363/16
5,029,062 7/1991 Capel ........................................ 363/26
5,138,249 8/1992 Capel ..................................... 323/283
5,208,740 5/1993 Ehsani .................................... 363/124
5,218,522 6/1993 Phelps et al. ........................... 363/124

Primary Examiner—Peter S. Wong
Assistant Examiner—Adolf Berhane
Attorney, Agent, or Firm—Robert W. Becker & Associates

[57] ABSTRACT

In a method for controlling rectifiers of an inductive element for reversible energy transmission first rectifiers are connected to a primary circuit of the inductive element and second rectifiers are connected to a secondary circuit of the inductive element. The first and the second rectifiers are switched in a constant timing ratio. The first rectifiers are controlled by a central signal source with a constant frequency. The second rectifiers are constant frequency. The signals derived from the changing potential at the inductive element. With this method it is possible to provide a control of the rectifiers such that they are switched depending on one another without being directly connected to one another.

21 Claims, 7 Drawing Sheets

METHOD FOR SYNCHRONIZING CONVERTERS OF AN INDUCTIVE ELEMENT FOR REVERSIBLE ENERGY TRANSMISSION

This application is a continuation-in-part, of application Ser. No. 08/016,983 filed Feb. 3, 1993 now abandoned.

BACKGROUND OF THE INVENTION

The present invention relates to a method for controlling rectifiers (converters) which are connected to the primary circuit and the secondary circuit of an inductive element for reversible energy transmission and which are switched in a constant timing ratio.

A method of the aforementioned kind is known from U.S. Pat. No. 3,986,097. In this device, the bilateral convertors (rectifiers) of the primary circuit as well as of the secondary circuit of the inductive element are connected to one common signal source via which with at least one respective further transmission device the rectifiers are simultaneously controllable. In this manner, a reversal of the energy flow is possible; however, the required constructive expenditure is considerable. Furthermore, this control method is not easily adaptable to inductive elements with components that are adjustable relative to one another.

It is therefore an object of the present invention to provide a method for controlling bilateral converters (rectifiers) of the aforementioned kind with which the rectifiers without being directly connected to one another can be switched dependent from one another. The required constructive expenditure should be minimal; and, furthermore, a universal applicability of the control method is desired while maintaining a high operational reliability, even when the method is used with inductive element having components that are adjustable or moveable relative to one another, for example, moveable components of robot arms or turntables relative to their support frame.

BRIEF DESCRIPTION OF THE DRAWINGS

This object, and other objects and advantages of the present invention, will appear more clearly from the following specification in conjunction with the accompanying drawings, in which:

FIG. 2 is a time diagram representing the individual switching operations occurring in a device according to FIG. 1a;

SUMMARY OF THE INVENTION

The method for controlling rectifiers (bilateral converters) of an inductive element for reversible energy transmission according to the present invention is primarily characterized by the steps of:

Connecting first rectifiers to a primary circuit of the inductive element;

Connecting second rectifiers to a secondary circuit of the inductive element;

Switching the first and the second rectifiers in a constant timing ratio;

Controlling the first rectifiers by a central signal source with a constant frequency; and Controlling the second rectifiers with control signals derived from the changing potential at the inductive element.

In two alternative embodiments of the present invention, the method may further comprise the step of collecting the control signals derived from the changing potential at the inductive element at the primary circuit or at the secondary circuit.

According to the present invention it is thus provided that the rectifiers of the primary circuit are controlled by a central signal source with a constant frequency ("master"), while the rectifiers of the secondary circuit are controlled with control signals that are derived from the changing potential of the inductive element ("slaves"). It is preferable to collect the respective control signals at the primary circuit or the secondary circuit, whereby it is preferred to employ the secondary circuit for this purpose.

Expediently, the method further comprises the step of switching off the second rectifiers ("slaves") by a control circuit having a timing element before switching the first rectifiers ("master") such that a current at the secondary circuit is zero at the moment of switching the first rectifiers. Preferably, the timing element of the control circuit is started for a subsequent switching step based on the change of the potential polarity of the first rectifiers. Furthermore, the second rectifiers are preferably activated with the control circuit directly after a change of the potential polarity of the first rectifiers has taken place.

Advantageously, the method alternatively further comprises the step of activating the second rectifiers before the change of the potential polarity of the first rectifiers in order to compensate for a switching delay. This is preferably achieved by activating the second rectifiers with a further timing element integrated into the control circuit and generating a respective control signal.

Furthermore, it is advantageous to provide the control circuit with a quartz oscillator for stabilizing the control circuit so that it is no longer necessary to rely on each switching step for synchronization purposes.

According to the present invention, the rectifiers (bilateral converters) connected within the primary circuit of the inductive element are controlled with a constant frequency while the rectifiers of the secondary circuit are controlled by control signals which are preferably generated from the change of potential at the inductive element. With this inventive arrangement it is thus possible in a simple manner to achieve a reversal of the energy flow in an automatic manner based on a change of the potentials at the inductive element. Even though the rectifiers of the primary and the secondary circuit are not directly connected, they are still switched in dependence from one another so that the energy flow direction is immediately reversible. The required circuitry is minimal because common transmitters are no longer required. Furthermore, the inventive method is usable for all inductive elements which are used for power and data transmission, even for inductive elements that have components that are adjustable moveable relative to one another, for example, rotatable relative to one another, without requiring additional circuitry components. With the inventive method a self-synchronizing switching of the rectifiers connected to the inductive element is thus provided.

The present invention furthermore relates to a method for synchronizing converters for reversible energy transmission between a first and a second circuit connected to one another by a cable connection, the method characterized by the steps of:

connecting a first converter to a first circuit with a power supply;

connecting at least one second converter to a second circuit with at least one consuming device and an auxiliary power supply;

switching the first and the at least one second converters in a constant timing ratio;

controlling the first converter by a signal source with a constant frequency; and controlling the at least one second converter with control signals derived from the changing potential at the first converter.

Preferably, the method further comprises the step of switching off the at least one second converter by a control circuit having a timing element before switching the first converter such that a current at the second circuit is zero at the moment of switching the first converter.

Advantageously, the method further comprises the step of starting the timing element of the control circuit for a subsequent switching step based on the change of the potential polarity of the first converter.

Expediently, the at least one second converter is switched with the control circuit directly after a change of the potential polarity of the first converter.

The method further comprises the step of activating the at least one second converter before a change of the potential polarity of the first converter in order to compensate for a switching delay. Preferably, the at least one second converter is activated with a further timing element integrated in the control circuit.

In a preferred embodiment of the present invention, the method comprises the step of connecting a quartz oscillator within the control circuit.

The present invention also relates to a method for synchronizing converters connected within a circuit for reversible energy transmission, wherein the method comprises the steps of:

providing one master converter;

controlling the master converter by a signal source with a constant frequency;

providing at least one slave converter connected to the master converter;

switching the master converter and the at least one slave converter in a constant timing ratio; and controlling the at least one slave converter with control signals derived from the potential change at the master converter.

Preferably, this method further comprises the step of switching off the at least one slave converter by a control circuit having a timing element before switching the master converter such that a current at the at least one slave converter is zero at the moment of switching the master converter.

The present invention also relates to a method for synchronizing converters of an inductive element with a first and a second circuit for reversible energy transmission and is characterized primarily by the following steps:

providing a first converter as a master and at least one second converter as a slave;

connecting the master to the first circuit of the inductive element;

controlling the master by a signal source with a constant frequency;

connecting the at least one slave to the second circuit of the inductive element;

switching the master and the at least one slave in a constant timing ratio; and controlling the at least one slave with control signals derived from the changing potential at the master.

Expediently, the at least one slave is switched off by a control circuit having a timing element before switching the master such that a current at the at least one slave is zero at the moment of switching the master.

The inventive method preferably further comprising the steps of:

providing at least one third converter as a further slave;

connecting the at least one further slave to the first circuit;

switching the master and the at least one slave and the at least one further slave in a constant timing ratio; and controlling the at least one slave and the at least one further slave with control signals derived from the changing potential at the master.

Preferably, the at least one slave and the at least one further slave are switched off by a control circuit having a timing element before switching the master such that a current at the at least one slave and the at least one further slave is zero at the moment of switching the master.

DESCRIPTION OF PREFERRED EMBODIMENTS

The present invention will now be described in detail with the aid of several specific embodiments utilizing FIGS. 1a–d and through 4.

Figure 1A:
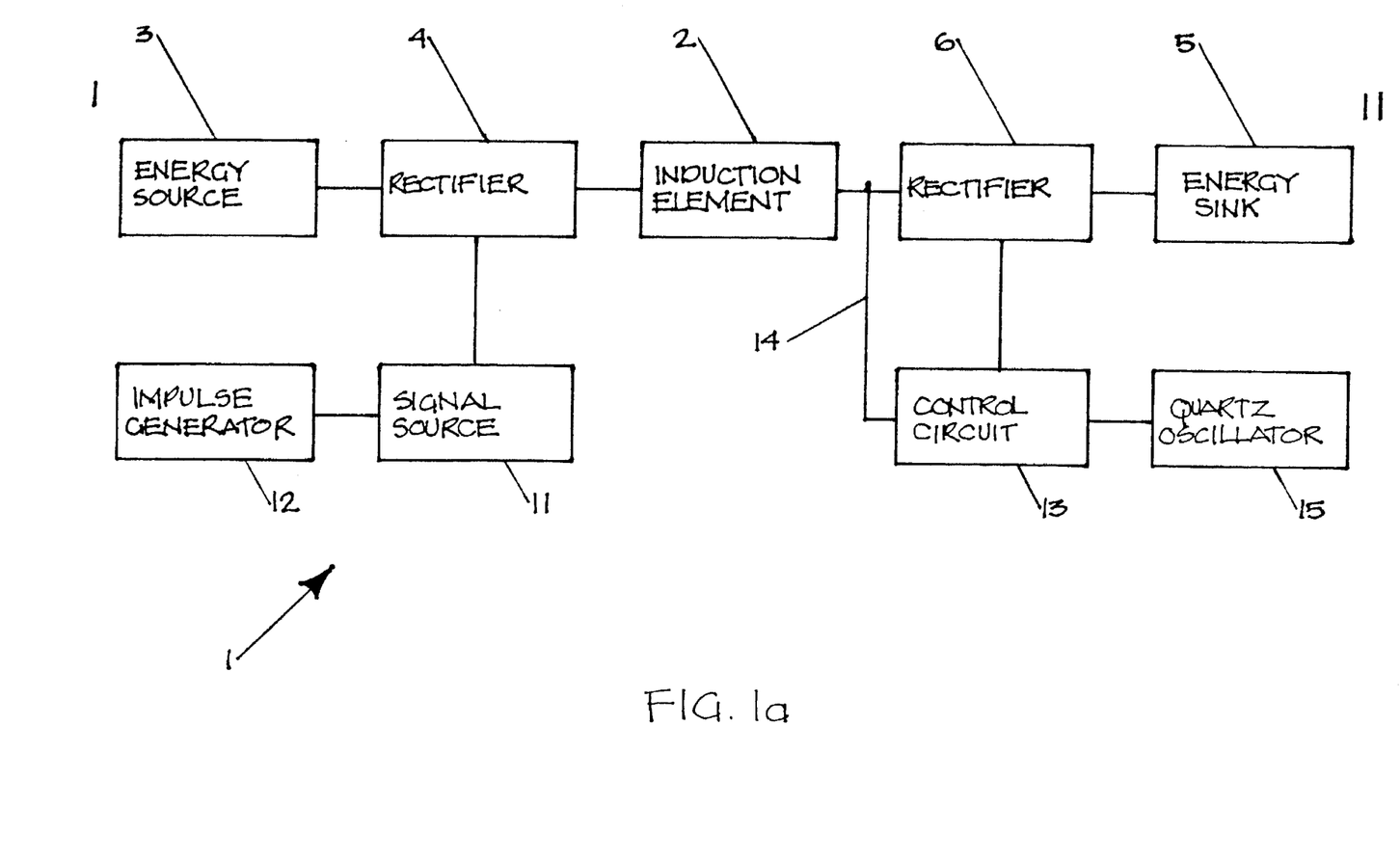
FIG. 1a shows a first embodiment of the circuit design in a block diagram.

The circuit diagram represented in FIG. 1a in the form of a block diagram, indicated with reference numeral 1, is comprised of an inductive element 2, for example, a transformer, for transmitting power and/or data in both flow directions, i.e., from an energy source 3 to an energy sink 5 and, upon reversal of the potentials, from the energy sink 5, now switched as an energy source, to the energy source 3, now switched as an energy sink. To the primary circuit I as well as to the secondary circuit II of the inductive element 2, one or more bilateral converters (rectifiers) 4, respectively, 6 are connected which are controlled in a special fashion.

Since power can be transmitted in both directions, i.e., a designated power supply side is not present, the terminology "primary" and "secondary" circuit in this context is only used for illustrative purposes and to simplify understanding of the invention. The terminology "first circuit" and "second circuit" is used to indicate the independence of the arrangement of the conventional "primary" and "secondary" sides of the transformer.

The rectifiers ("master") 4 of the primary circuit I (first circuit) which are connected to the energy source 3 are controlled by a switching signal source 11 which is controlled at a constant frequency. This frequency is generated by an impulse generator 12 which preferably contains a quartz oscillator.

The rectifiers ("slaves") 6 of the second circuit II (second circuit) are controlled by a control circuit 13 which operates independent of the signal source 11 controlling the rectifiers 4. The control signals of the control circuit 13 are derived from the potential changes at the inductive element 2 and are supplied from the inductive element 2 via a signal line 14 to the control circuit 13. The control circuit 13 furthermore has coordinated therewith a quartz oscillator 15 for stabilizing the control circuit 13. With this arrangement it is no longer necessary to rely on each potential switching event at the primary circuit I for synchronizing purposes. Instead, the synchronization between the switching signal source 11 of the primary circuit I and the control circuit 13 of the secondary circuit II can be carried out, for example, only for each hundredth switching event.

Figure 2:
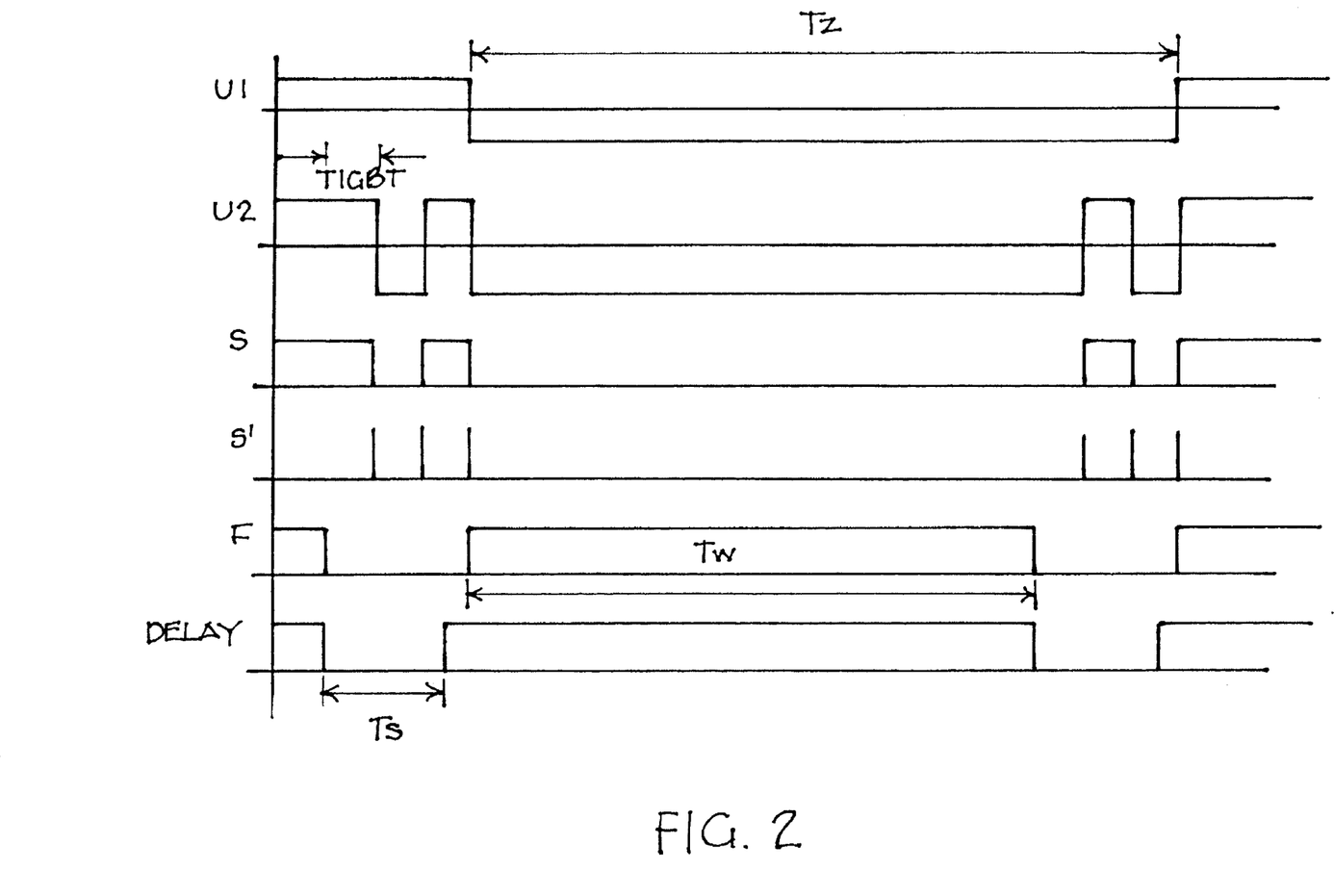
Figure 3:
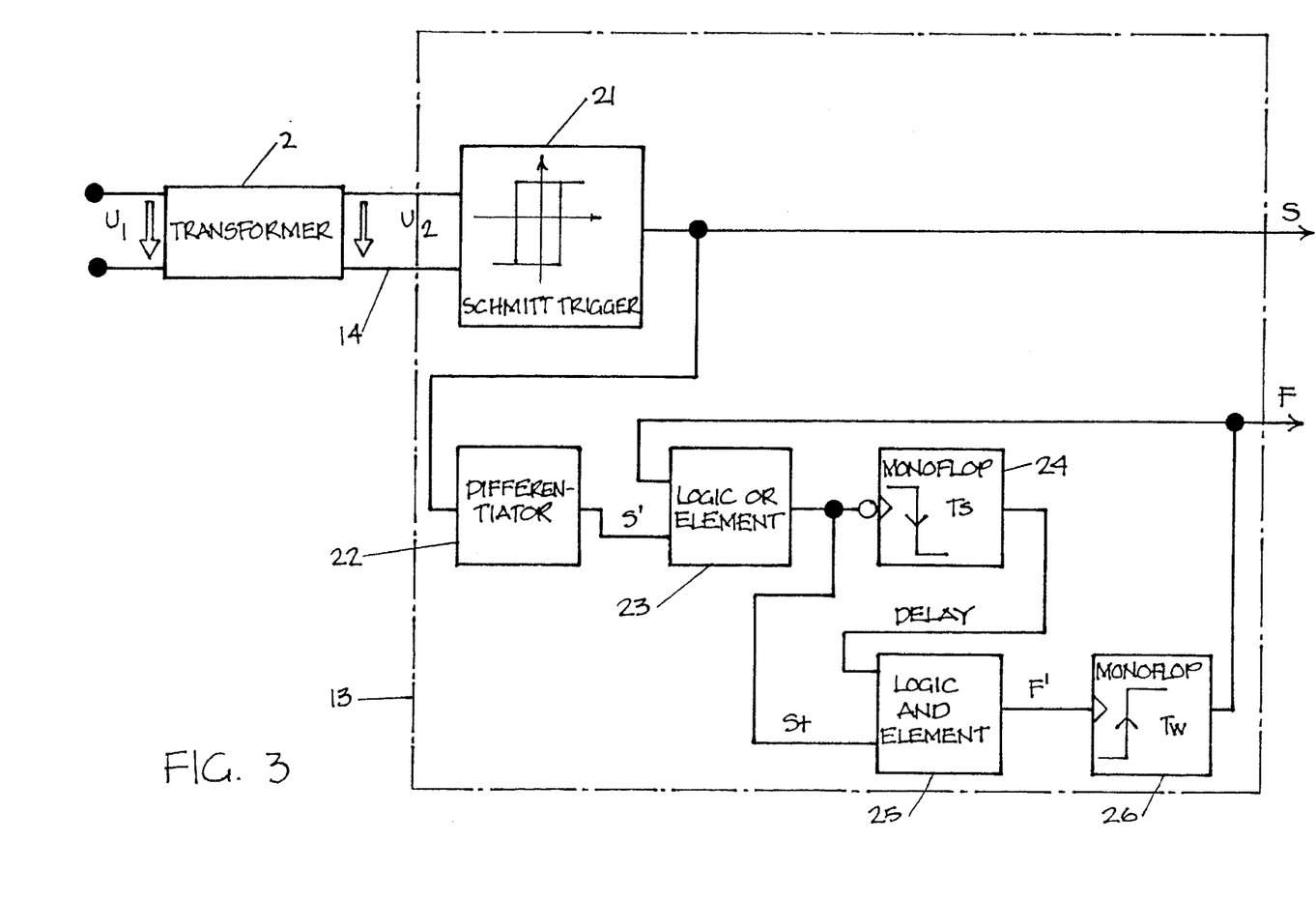
FIG. 3 shows the control circuit according to FIG. 1a for evaluating the potential changes at the inductive element.

The rectifiers 4 of the primary circuit I are controlled, as can be seen in the time diagram of FIG. 2, with the switching signal source 11 at a stable and constant signal sequence. After the time period $T_z$ has elapsed, the rectifiers 4 are switched, i.e., the potential is reversed. This results in the potential U1 within the primary circuit I of the inductive element 2, as shown in FIG. 2.

The switching control is achieved by switching off the rectifiers 6 of the secondary circuit II a certain time before elapse of the known cycle time $T_z$. This is illustrated by the representation of the release signal F after elapse of the waiting period $T_w$, whereby $T_w < T_z$.

The rectifiers 6 have a certain delay time Tigbt. Because of this, the secondary potential first remains unchanged. After elapse of the delay time Tigbt, the rectifiers 6 are blocked and the current decreases to zero. As long as the current decreases to zero, the sign of the potential $U_2$ changes. As soon as the current reaches zero, the course of the potential $U_2$ corresponds to the course of the potential $U_1$ because the inductive element 2 no longer carries current. From this point in time on the change of the potential $U_1$ can be detected at the secondary circuit II. As soon as the potential $U_1$ and thus also the potential $U_2$ is switched on by the rectifiers 4 of the primary circuit I, the release signal F for the waiting period $T_w$ is sent at the secondary circuit II, and the rectifier 6 at the secondary circuit II are released.

The release signal F is generated such that disturbances have no influence. For this purpose, after elapse of the waiting period $T_w$, a further delay time $T_s$ is started until the current has reached zero. Thus, the course of the potential $U_2$ can be reliably determined. In the time diagram of FIG. 2 this is indicated by the signal "Delay".

The evaluation of the course of the potential $U_2$ can be carried out in various ways. In the embodiment shown in FIG. 3, a threshold switch 21 (Schmitt Trigger) within the control circuit 13 generates a switching signal S which corresponds to the course of the potential $U_2$, but does not indicate the corresponding level. The switching signal S is then differentiated within a differentiator 22 and the signal S' results. With the signal S' an auxiliary signal St is generated with the assistance of a logic element 23. The auxiliary signal St, however, can only start the time element 26 with the waiting time $T_w$, via an auxiliary signal F' after elapse of the delay time $T_s$ of the time element 24 and thus generate the release signal F. The locking of the auxiliary signal St by the signal "Delay" occurs with the removal of the release signal F which always occurs before the generation of the signal S' because the rectifiers 6 have a certain delay time.

Figure 4:
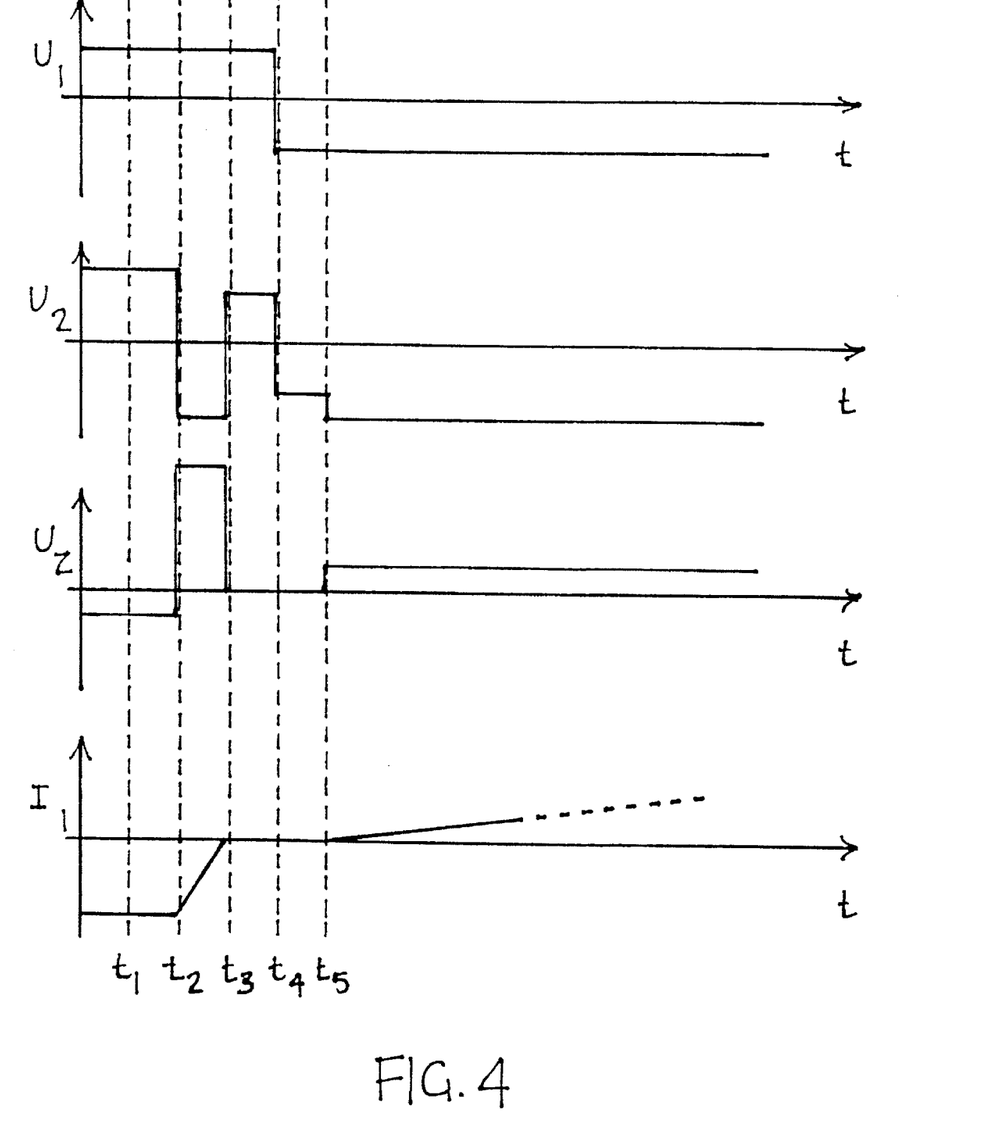
FIG. 4 shows a time diagram of potential and current at the time of a switching operation.

The time events represented in FIG. 4 correspond to the following:

$U_1$: Potential at inductive element 2 within the primary circuit I;

$U_2$: Potential at inductive element 2 within the secondary circuit II;

$U_z$: Course of potential at the inductive element 2;

$I_1$: Current at the primary circuit I;

$t_1$: At this point in time the release signal F is removed, the waiting period $T_w$ has elapsed;

$t_2$: After elapse of the delay time Tigbt of the rectifiers 6, the rectifiers 6 of the secondary circuit II are blocked. The current decreases to zero and the secondary potential changes accordingly;

$t_3$: The current is zero; $U_2$ corresponds to $U_1$, and no potential occurs at the inductive element 2;

$t_4$: The rectifiers 4 within the primary circuit I are switched, the potential at the secondary circuit II corresponds to that of the primary circuit I, the release signal F is again started;

$t_5$: After elapse of the delay time Tight the rectifiers 6 are switched and current begins to flow, and accordingly a potential is observed at the inductive element 2.

With the inventive method corresponding to FIG. 1, it is thus possible to control the rectifiers 4 and 6 such that they are automatically synchronized whereby the control signals are generated by evaluating the potentials present at the rectifiers as well as at the inductive element and the respective potential changes. At the ac inlet of the rectifier 6 of the secondary circuit II the reversal of the alternating current caused by the rectifier 4 of the primary circuit I is detected. The side of the rectifier 6 which is connected to the alternating current is provided with a high resistance at the point of switching of the rectifier 4 so that the alternating current of the rectifier 6 is not newly impressed by itself. The high-resistance switching of the rectifier 6 is controlled by the control circuit 13 which is self-synchronized by the potential at the inductive element 2 together with the switching signal source 11 of the rectifier 4.

Figure 1B:
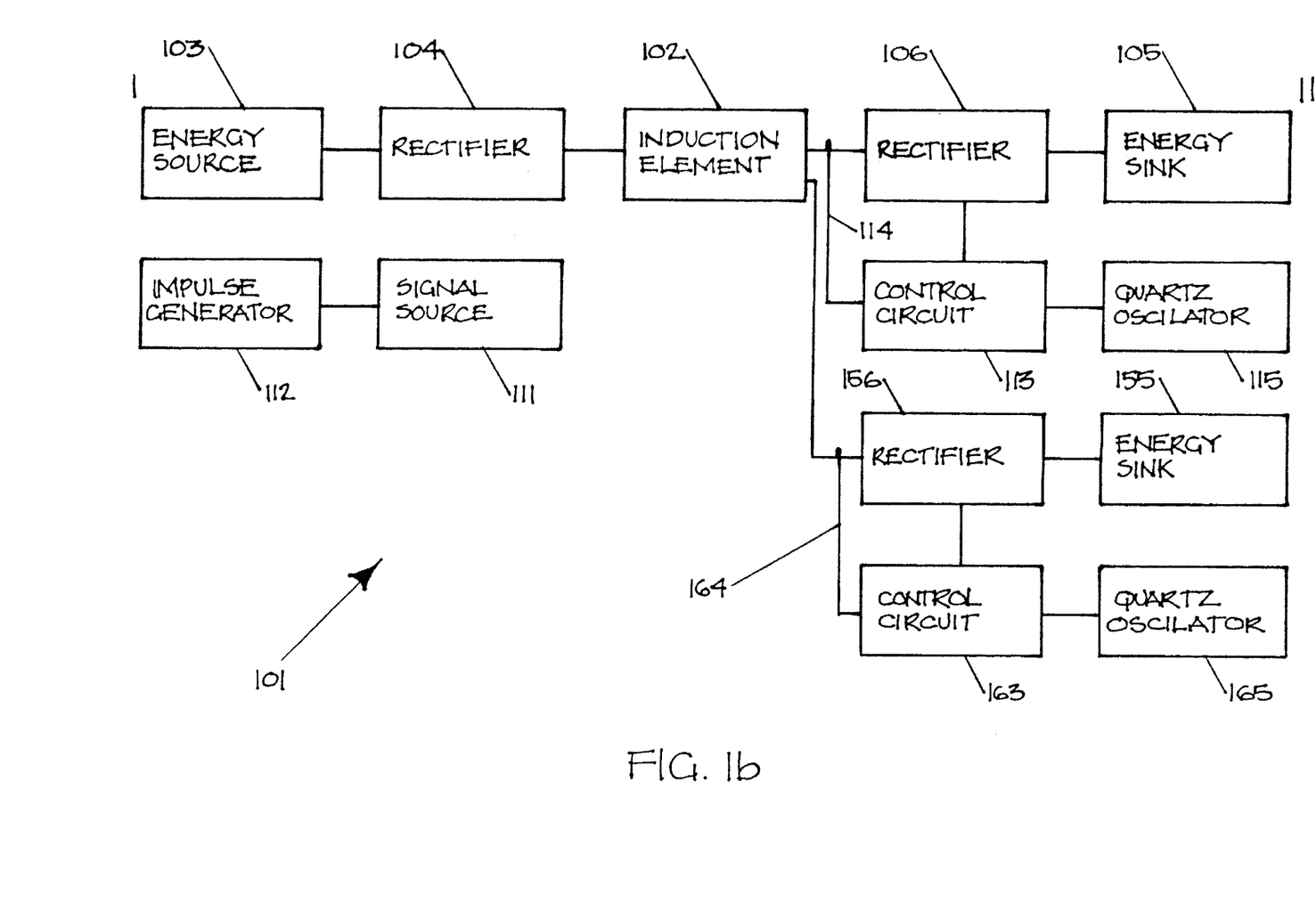
FIG. 1b shows a second embodiment with two converters.
Figure 1C:
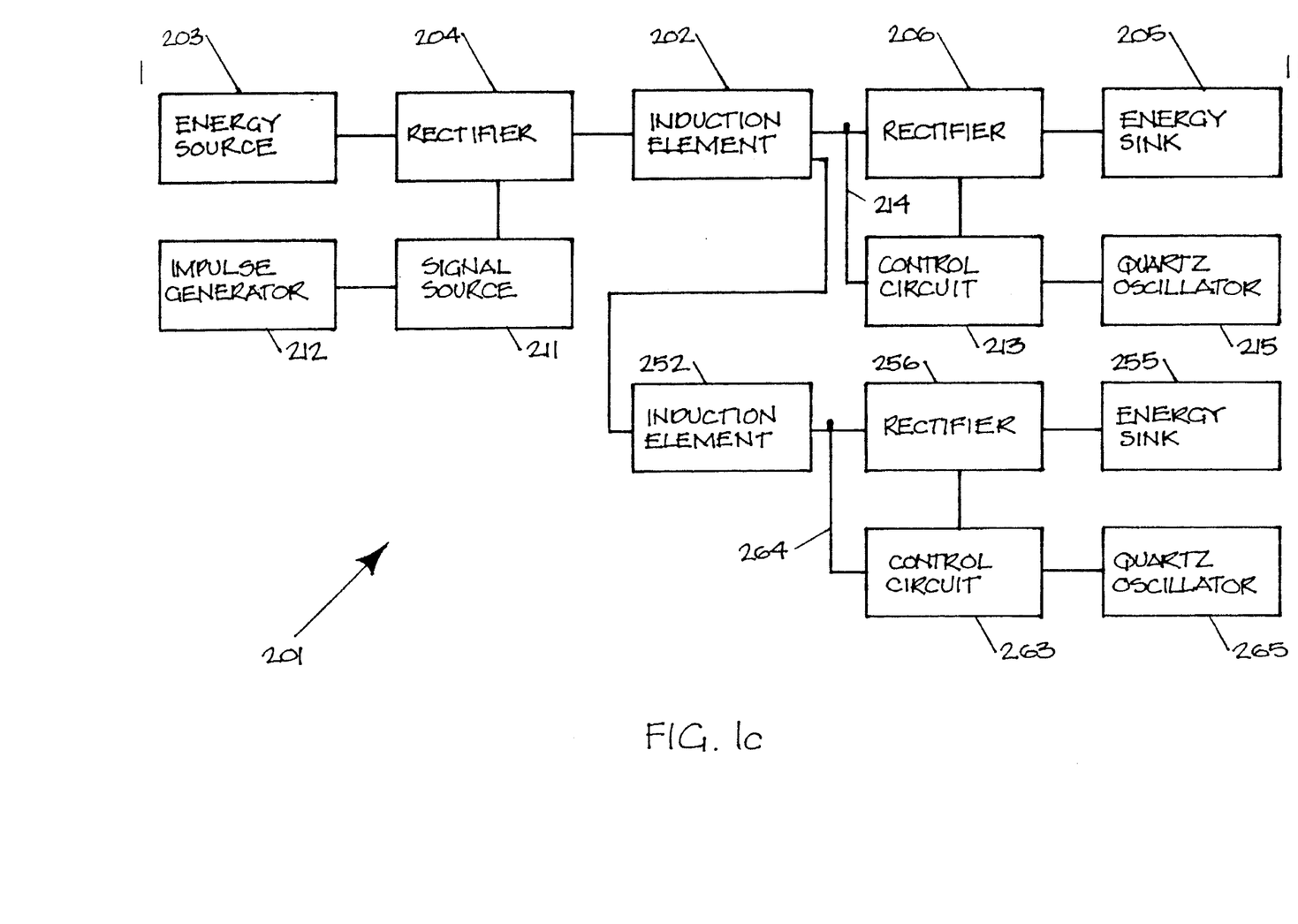
FIG. 1c shows a third embodiment with two converters on the second side each connected to an inductive element.
Figure 1D:
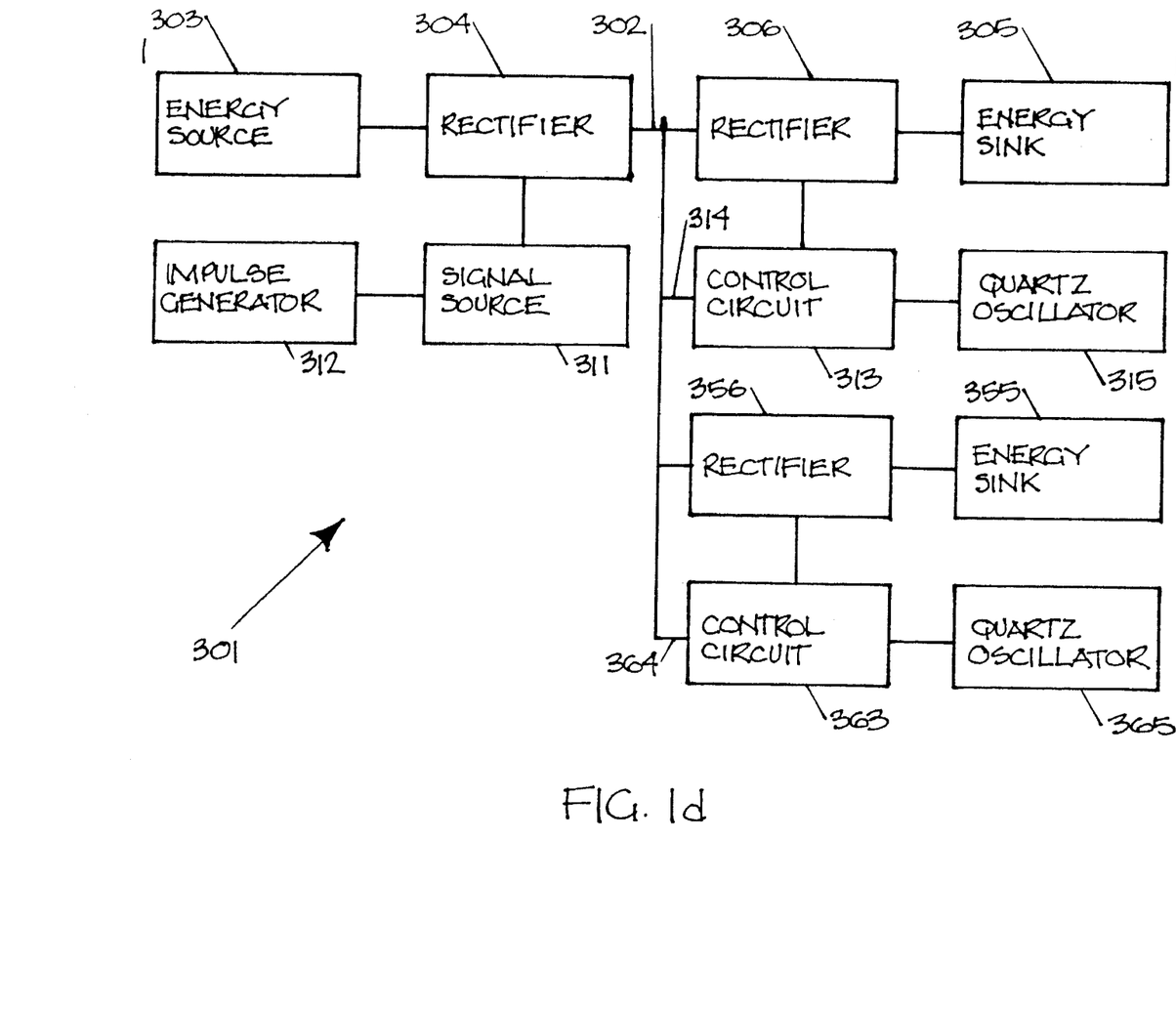
FIG. 1d shows a fourth embodiment with two converters on the second side in which the inductive element is replaced by a cable connection.

FIGS. 1b–1d illustrate examples with two bilateral converters within the second circuit. Of course, it is possible to use more than two converters in the second circuit, i.e., three, four or more, for a respective number of energy sinks (consuming devices).

FIG. 1b shows an alternative embodiment of a circuitry 101 for use with the inventive method for controlling (synchronizing) bilateral converters. The first circuit (I) of the inductive element 102 comprises: an energy source (power supply) 103, which as described in connection with FIG. 1a can also serve as an energy sink depending on the direction of energy transfer; a bilateral converter 104; and a switching signal source 112 with an impulse generator 112, preferably containing a quartz oscillator. To the second circuit (11) two bilateral converters 106, 156 are connected. Via lines 114 and 164 control circuits 113 and 163 for controlling the bilateral converters are connected to the bilateral converters 106, 156, respectively. Each control circuit 113, 163 has an impulse generator (quartz oscillator) 115, 165. The energy sources or sinks are (their function depends on the direction of energy transfer) indicated at 105 and 155. The inventive control or synchronizing method as described in context with FIG. 1a can be applied to the circuitry of FIG. 1b.

FIG. 1c shows another embodiment of a circuitry 201 to be used with the inventive method for controlling (synchronizing) bilateral converters in connection with two energy sinks (consuming devices) at the second circuit. The first circuit (I) of the inductive element 202 comprises: an energy source (power supply) 203, which as described in connection with FIG. 1a can also serve as an energy sink depending on the direction of energy transfer; a bilateral converter 204; and a switching signal source 212 with an impulse generator 212, preferably containing a quartz oscillator. The second circuit (II) comprises a further inductive element 252. To the inductive element 202 a bilateral converter 206 is connected and to the inductive element 252 a second converter 256 is connected. Via line 214, 264 a control circuit 213, 263 with impulse generator 215, 265 for controlling the respective bilateral converter is connected to the inductive elements 202, 252. The energy sources or sinks (their function depends on the direction of energy transfer) are indicated at 205 and 255. The inventive control or synchronizing method as described in context with FIG. 1a can be applied to the circuitry of FIG. 1c.

FIG. 1d shows another embodiment of a circuitry 301 to be used with the inventive method for controlling (synchronizing) bilateral converters in connection with two energy sinks (consuming devices) at the second circuit. However, this embodiment no longer uses an inductive element. Instead the first circuit (I) and the second circuit (II) are connected by a cable connection 302. The first circuit (I) comprises: an energy source (power supply) 303, which as described in connection with FIG. 1a can also serve as an energy sink depending on the direction of energy transfer; a bilateral converter 304; and a switching signal source 311 with an impulse generator 312, preferably containing a quartz oscillator. A first and a second bilateral converter 306, 356 are connected to the electric line 302. Via line 314, 364 control circuits 313, 363 with impulse generator 315, 365 are connected to the cable connection for controlling the bilateral converters 306, 356. The energy sources or sinks are indicated at 305 and 355. The inventive control or synchronizing method as described in context with FIG. 1a can be applied to the circuitry of FIG. 1b. For example, such a circuitry is useful in connection with one or more power supplies that serve a plurality of consuming devices and a buffer battery wherein all components are directly connected. As long as the power supply is operational, the battery is charged. When a power outage occurs, the battery immediately takes over the supply function for the consuming devices because the corresponding converter is synchronized with the converter(s) present within the first circuit one of which converters operates as a "master" with a constant frequency with all other converters ("slaves") being synchronized by the "master".

It is also possible, but not illustrated in the drawings, to have a slave converter (a converter that is synchronized by the master converter) within the same circuit side of the inductive element to which the master converter is connected since the control, i.e., the synchronization is effected by a signal derived form the potential change at the master converter. The inventive method basically provides synchronization of slaves by a master within any conceivable circuitry diagram.

The present invention is, of course, in no way restricted to the specific disclosure of the specification and drawings, but also encompasses any modifications within the scope of the appended claims.

What I claim is:

1. A method for synchronizing converters of an inductive element for reversible energy transmission, said method comprising the steps of:

connecting a first said converter to a first circuit of said inductive element;

connecting at least one second said converter to a second circuit of said inductive element;

switching said first and said one second converter in a constant timing ratio;

controlling said first converter by a signal source with a constant frequency; and controlling said one second converter with control signals derived from the changing potential at said second circuit of said inductive element.

2. A method according to claim 1, further comprising the step of:

switching off said one second converter by a control circuit having a timing element before switching said first converter such that a current at said second circuit is zero at the moment of switching said first converter.

3. A method according to claim 2, further comprising the step of:

starting said timing element of said control circuit for a subsequent switching step based on the change of the potential polarity of said first converter.

4. A method according to claim 2, further comprising the step of:

activating said one second converter with said control circuit directly after a change of the potential polarity of said first converter.

5. A method according to claim 2, further comprising the step of:

activating said one second converter before a change of the potential polarity of said first converter in order to compensate for a switching delay.

6. A method according to claim 5, further comprising the step of:

activating said one second converter with a further timing element integrated in said control circuit.

7. A method according to claim 2, further comprising the step of:

connecting a quartz oscillator within said control circuit.

8. A method for synchronizing converters of an inductive element for reversible energy transmission, said method comprising the steps of:

arranging components of an inductive element so as to be moveable relative to one another;

connecting a first said converter to a first circuit of said inductive element;

connecting at least one second said converter to a second circuit of said inductive element;

switching said first and said one second converters in a constant timing ratio;

controlling said first converter by a signal source with a constant frequency; and controlling said one second converter with control signals derived from the changing potential at said second circuit of said inductive element.

9. A method for synchronizing converters for reversible energy transmission between a first and a second circuit connected to one another by a cable connection, said method comprising the steps of:

connecting a first said converter to a first circuit with a power supply;

connecting at least one second said converter to a second circuit with at least one consuming device and an auxiliary power supply;

switching said first and said one second converters in a constant timing ratio;

controlling said first converter by a signal source with a constant frequency; and controlling said one second converter with control signals derived from the changing potential at said first converter.

10. A method according to claim 9, further comprising the step of:

switching off said one second converter by a control circuit having a timing element before switching said first converter such that a current at said second circuit is zero at the moment of switching said first converter.

11. A method according to claim 10, further comprising the step of:

starting said timing element of said control circuit for a subsequent switching step based on the change of the potential polarity of said first converter.

12. A method according to claim 10, further comprising the step of:

activating said one second converter with said control circuit directly after a change of the potential polarity of said first converter.

13. A method according to claim 10, further comprising the step of:

activating said one second converter before a change of the potential polarity of said first converter in order to compensate for a switching delay.

14. A method according to claim 13, further comprising the step of:

activating said one second converter with a further timing element integrated in said control circuit.

15. A method according to claim 10, further comprising the step of:

connecting a quartz oscillator within said control circuit.

16. A method for synchronizing converters connected within a circuit for reversible energy transmission, said method comprising the steps of:

providing one master converter;

controlling said master converter by a signal source with a constant frequency;

providing at least one slave converter connected to said master converter;

switching said master converter and said one slave converter in a constant timing ratio; and controlling said one slave converter with control signals derived from the potential change at said master converter.

17. A method according to claim 16, further comprising the step of:

switching off said at least one slave converter by a control circuit having a timing element before switching said master converter such that a current at said at least one slave converter is zero at the moment of switching said master converter.

18. A method for synchronizing converters of an inductive element with a first and a second circuit for reversible energy transmission, said method comprising the steps of:

providing a first converter as a master converter and at least one second converter as a slave converter;

connecting said master converter to the first circuit of said inductive element;

controlling said master converter by a signal source with a constant frequency;

connecting said one slave converter to the second circuit of said inductive element;

switching said master converter and said one slave converter in a constant timing ratio; and controlling said one slave converter with control signals derived from the changing potential at said master converter.

19. A method according to claim 18, further comprising the step of:

switching off said one slave converter by a control circuit having a timing element before switching said master converter such that a current at said one slave converter is zero at the moment of switching said master converter.

20. A method according to claim 18, further comprising the step of:

providing at least one third converter as a further slave converter;

connecting said further slave converter to the first circuit; and switching said master converter and said one slave converter and said further slave converter in a constant timing ratio; and controlling said one slave converter and said further slave converter with control signals derived from the changing potential at said master converter.

21. A method according to claim 20, further comprising the step of:

switching off said one slave converter and said further slave converter by a control circuit having a timing element before switching said master converter such that a current at said one slave converter and said further slave converter is zero at the moment of switching said master converter.

* * * * *